United States Patent
Wang et al.

(10) Patent No.: US 11,070,580 B1
(45) Date of Patent: Jul. 20, 2021

(54) VULNERABILITY SCANNING METHOD, SERVER AND SYSTEM

(71) Applicant: WANGSU SCIENCE & TECHNOLOGY CO., LTD., Shanghai (CN)

(72) Inventors: Haihan Wang, Shanghai (CN); Younan Xu, Shanghai (CN); Qifu Zhong, Shanghai (CN); Chunyi Shi, Shanghai (CN)

(73) Assignee: WANGSU SCIENCE & TECHNOLOGY CO., LTD., Shanghai (CN)

( * ) Notice: Subject to any disclaimer, the term of this patent is extended or adjusted under 35 U.S.C. 154(b) by 503 days.

(21) Appl. No.: 16/099,815

(22) PCT Filed: Feb. 28, 2018

(86) PCT No.: PCT/CN2018/077557
§ 371 (c)(1),
(2) Date: Nov. 8, 2018

(87) PCT Pub. No.: WO2019/153384
PCT Pub. Date: Aug. 15, 2019

(30) Foreign Application Priority Data

Feb. 7, 2018 (CN) .......................... 201810124877.X

(51) Int. Cl.
*H04L 29/06* (2006.01)
(52) U.S. Cl.
CPC ................................. *H04L 63/1433* (2013.01)
(58) Field of Classification Search
CPC .................................................. H04L 63/1433
See application file for complete search history.

(56) References Cited

U.S. PATENT DOCUMENTS 7,950,056 B1 * 5/2011 Satish ................... G06F 21/554
726/22
9,239,745 B1 1/2016 Pennington et al.
(Continued)

FOREIGN PATENT DOCUMENTS

CN      1558605 A    12/2004
CN      1870493 A    11/2006
(Continued)

OTHER PUBLICATIONS

The European Patent Office (EPO) the Extended European Search Report for 18871818.3 dated Mar. 1 2021 7 Pages.
(Continued)

*Primary Examiner* — Sarah Su
(74) *Attorney, Agent, or Firm* — Anova Law Group, PLLC

(57) ABSTRACT

A vulnerability scanning method includes: identifying a host service running on a target host and creating a scan task that matches the identified host service; issuing the created scan task to a task scheduling center, to allow a proxy node to acquire at least one scan task from the task scheduling center, where the proxy node executes the at least one scan task for the target host, and obtains a scan result; and receiving the scan result fed back by the proxy node, determining whether there exists a specified host service in the identified host service, where the specified host service signifies an existence of a web site resource running on the target host, and if there exists the specified host service in the identified host service, issuing again a scan subtask corresponding to the specified host service to the task scheduling center.

17 Claims, 6 Drawing Sheets

(56) References Cited

U.S. PATENT DOCUMENTS

| | | | |
|---|---|---|---|
| 2004/0078384 A1* | 4/2004 | Keir | G02B 6/105 |
| 2005/0132184 A1* | 6/2005 | Palliyil | G06F 21/56 |
| | | | 713/152 |
| 2010/0293616 A1 | 11/2010 | Young | |
| 2011/0247045 A1* | 10/2011 | Rajagopal | H04L 63/102 |
| | | | 726/1 |
| 2011/0314143 A1* | 12/2011 | Vogel, III | H04L 41/12 |
| | | | 709/224 |
| 2012/0084862 A1* | 4/2012 | Freeman | G06F 9/44505 |
| | | | 726/23 |
| 2014/0373125 A1 | 12/2014 | Huang et al. | |
| 2015/0058923 A1* | 2/2015 | Rajagopal | G06F 21/53 |
| | | | 726/1 |
| 2016/0364567 A1* | 12/2016 | Akiyama | G06F 21/56 |
| 2017/0034203 A1 | 2/2017 | Long | |
| 2017/0046211 A1* | 2/2017 | Jayawardena | G06F 9/45512 |
| 2017/0142134 A1* | 5/2017 | Gilbert | G06F 21/564 |
| 2018/0227314 A1* | 8/2018 | Galchenko | G06F 9/5027 |
| 2019/0081981 A1* | 3/2019 | Bansal | H04L 63/20 |
| 2019/0222587 A1* | 7/2019 | Kamir | H04L 63/1491 |
| 2019/0222598 A1* | 7/2019 | Louie | G06N 5/047 |
| 2020/0137084 A1* | 4/2020 | Roy | H04L 63/0236 |

FOREIGN PATENT DOCUMENTS

| | | |
|---|---|---|
| CN | 102104601 A | 6/2011 |
| CN | 104285219 A | 1/2015 |
| CN | 104392175 A | 3/2015 |

OTHER PUBLICATIONS

The China National Intelleectual Property Administration (CNIPA) the China Search Report for 201810124877.X Oct. 15, 2019 9 Pages.

* cited by examiner

US 11,070,580 B1

VULNERABILITY SCANNING METHOD, SERVER AND SYSTEM

CROSS-REFERENCES TO RELATED APPLICATIONS

This application is a national phase entry under 35 U.S.C § 371 of International Application No. PCT/CN2018/077557 filed on Feb. 28, 2018, which claims priority of Chinese Patent Application No. 201810124877X, filed with the State Intellectual Property Office of P. R. China on Feb. 7, 2018, the entire contents of all of which are incorporated herein by reference.

FIELD OF THE DISCLOSURE

The present disclosure generally relates to the field of Internet technology and, more particularly, relates to a vulnerability scanning method, a server, and a system thereof.

BACKGROUND

With the continuous development of Internet technology, the problem of information security on the Internet has become increasingly prominent. At present, cyber-attacks exploiting computer vulnerability and network system flaws have become an important way for criminals to seek private interests and commit crimes. In order to fix computer vulnerabilities in time, it is usually necessary to employ a vulnerability scanning tool to scan a computer so as to detect existing or potential vulnerabilities in the computer.

When a traditional vulnerability scanning tool scans a computer, the scanning content is pre-customized. The vulnerability scanning tool may execute a one-time scan of the pre-customized scanning content, thereby detecting potential vulnerabilities defined in the scanning content. However, this vulnerability scanning method has a major limitation. The content scanned for the computer can be only limited to the pre-customized content. For different computers, the customized scanning content may be not applicable, or a full vulnerability scan cannot be conducted on these computers. Therefore, the accuracy of vulnerability scanning in the existing technologies is not high enough.

BRIEF SUMMARY OF THE DISCLOSURE

The purpose of the present disclosure is to provide a vulnerability scanning method, a server, and a system thereof, which may improve the accuracy of vulnerability scanning.

To achieve the above purpose, in one aspect, the present disclosure provides a vulnerability scanning method. The method includes: identifying a host service running on a target host and creating a scan task that matches the identified host service; issuing the created scan task to a task scheduling center, to allow a proxy node to acquire at least one scan task from the task scheduling center, where the proxy node executes the at least one scan task for the target host, and obtains a scan result; and receiving the scan result fed back by the proxy node, determining whether there exists a specified host service in the identified host service, where the specified host service signifies an existence of a website resource running on the target host, and if there exists the specified host service in the identified host service, issuing again a scan subtask corresponding to the specified host service to the task scheduling center, where the scan subtask is acquired by the proxy node from the task scheduling center and is executed for the target host to obtain a scan result corresponding to the specified host service on the target host.

To achieve the above purpose, in another aspect, the present disclosure further provides a server. The server comprises a memory and a processor, where the memory stores computer programs that, when executed by the processor, implement the following steps: identifying a host service running on a target host and creating a scan task that matches the identified host service; issuing the created scan task to a task scheduling center, to allow a proxy node to acquire at least one scan task from the task scheduling center, where the proxy node executes the at least one scan task for the target host, and obtains a scan result; and receiving the scan result fed back by the proxy node, determining whether there exists a specified host service in the identified host service, where the specified host service signifies an existence of a website resource running on the target host, and if there exists the specified host service in the identified host service, issuing again a scan subtask corresponding to the specified host service to the task scheduling center, where the scan subtask is acquired by the proxy node from the task scheduling center and executed for the target host to obtain a scan result corresponding to the specified host service on the target host.

To achieve the above purpose, in another aspect, the present disclosure further provides a vulnerability scanning system. The system comprises a server, a task scheduling center, and a proxy node, where: the server is configured to identify a host service running on a target host, create a scan task that matches the identified host service, issue the created scan task to a task scheduling center, determine whether there exists a specified host service in the identified host service, where the specified host service signifies an existence of a website resource running on the target host, if there exists the specified host service in the identified host service, issue again a scan subtask corresponding to the specified host service to the task scheduling center, and receive a scan result fed back by the proxy node; the task scheduling center is configured to receive the scan task or scan subtask issued by the server, and place the received scan task or scan subtask in a task queue; and the proxy node is configured to acquire at least one scan task or scan subtask from the task scheduling center, execute the at least one scan task or scan subtask for the target host to obtain a scan result, and feed back the obtained scan result to the server.

As can be seen from the above, the technical solutions provided by the present disclosure may issue scan tasks multiple times when executing vulnerability scanning on a target host, and each issued scan task is determined based on an identification of a service, a website, or a component on the host. Specifically, when a host service is identified on the target host, the server may issue a scan task corresponding to the host service to the task scheduling center. If the identified host service contains a specified host service that signifies a website resource, the server may issue again a scan subtask for the specified host service. Compared to the previously issued scan task, the scan subtask may scan possible vulnerabilities in the specified host service more comprehensively. After issuing the scan subtask for the specified host service that signifies the website resource, a page address associated with the website resource may also continue to be collected. For the collected page address, the server may further issue a page application scan task, so that possible vulnerabilities on a page of the website may be further scanned. Further, a web fingerprint corresponding to the collected page address may be identified. By matching the web fingerprint with the preset fingerprint database, it may be determined whether a specified page component exists in the page of the website. If there exists the specified page component, the server may further issue a page component scan task, so that the specified page component with possible vulnerabilities can be scanned. As can be seen from the above, the technical solutions provided by the present disclosure generate the corresponding scan tasks each time based on the results identified from the host, and issue the scan tasks multiple times, so that the target host can be deliberately scanned deeper and deeper. In addition, the technical solutions provided by the present disclosure may not only scan the host, but also scan the websites that are operated and maintained on the host, so that a more comprehensive scanning process can be achieved. In terms of system architecture, by adopting a distributed scanning mode of the server and proxy nodes, a mode of multiple proxy nodes scanning in parallel may be employed to improve the efficiency of vulnerability scanning. Therefore, the technical solutions provided by the present disclosure may not only improve the accuracy of vulnerability scanning, but also the efficiency of the vulnerability scanning.

BRIEF DESCRIPTION OF THE DRAWINGS

To make the technical solutions in the embodiments of the present disclosure clearer, a brief introduction of the accompanying drawings consistent with descriptions of the embodiments will be provided hereinafter. It is to be understood that the following described drawings are merely some embodiments of the present disclosure. Based on the accompanying drawings and without creative efforts, persons of ordinary skill in the art may derive other drawings.

DETAILED DESCRIPTION

To make the objectives, technical solutions, and advantages of the present disclosure clearer, specific embodiments of the present disclosure will be made in detail with reference to the accompanying drawings.

Embodiment 1

Figure 1:
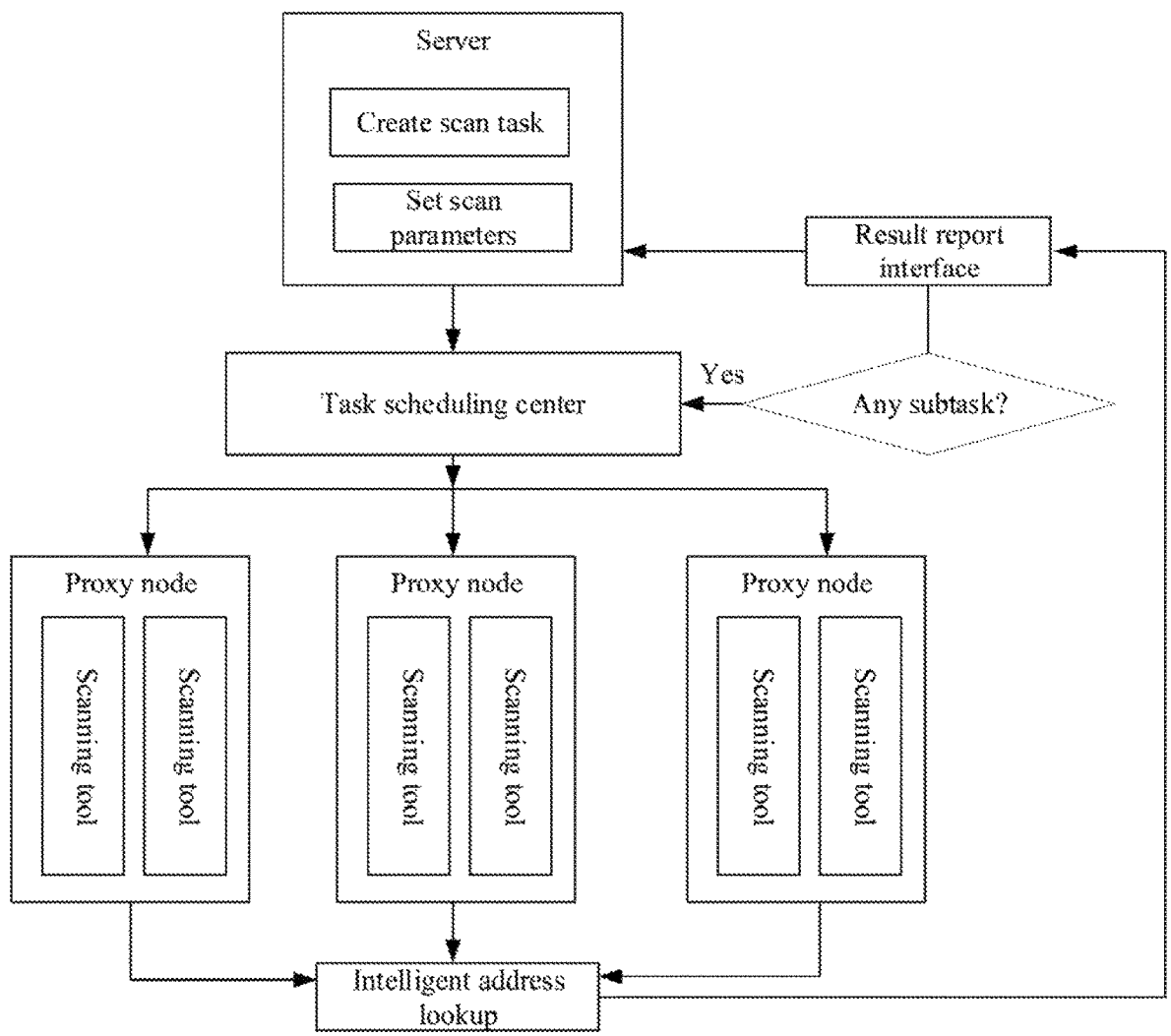
FIG. 1 is a schematic diagram of a system architecture according to some embodiments of the present disclosure.

The technical solutions provided by the present disclosure may be applied to a system architecture shown in FIG. 1. Referring to FIG. 1, the system architecture may include a server, a task scheduling center, and a proxy node. The server may be configured to create a scan task for vulnerability scanning, the task scheduling center may receive a scan task issued by the server, and the proxy node may acquire a scan task from the task scheduling center, execute the acquired scan task for the corresponding host to obtain a scan result related to the host. The scan result may be reported by the proxy node to the server.

In the present disclosure, the system architecture may be deployed in a manner of a distributed system. There may be a plurality of proxy nodes. Each proxy node may be connected to the task scheduling center. Some proxy nodes may obtain different scan tasks for the same host, and these proxy nodes may execute the acquired scan tasks in parallel, thereby improving the efficiency of vulnerability scanning.

Figure 2:
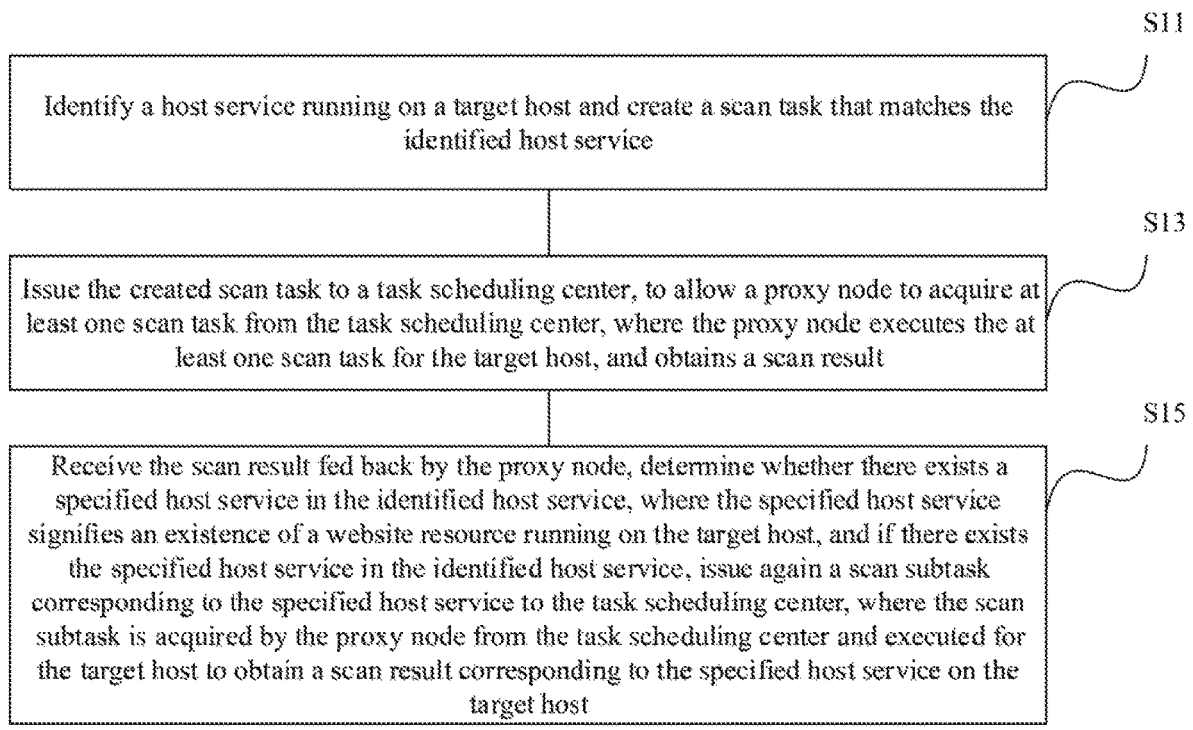
FIG. 2 is a flowchart of a vulnerability scanning method according to some embodiments of the present disclosure.
Figure 3:
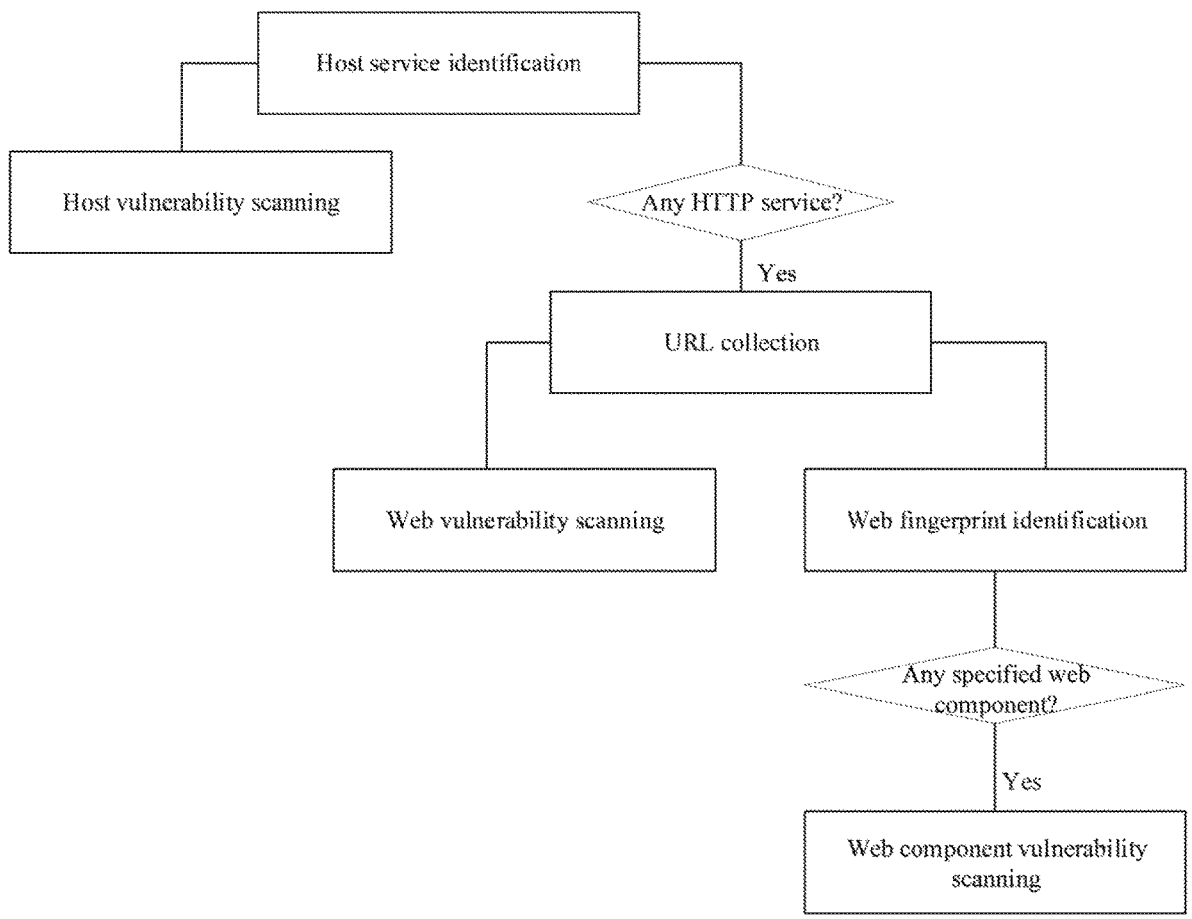
FIG. 3 is a flowchart of vulnerability scanning according to some embodiments of the present disclosure.

The present disclosure provides a vulnerability scanning method, which may be applied to the above system architecture. Referring to FIG. 2 and FIG. 3, the method may include the following steps. The server may be the execution entity of the following steps S11 to S15.

S11: identifying a host service running on a target host and creating a scan task that matches the identified host service.

In the disclosed embodiment, the target host may be a host to be scanned for vulnerability. When issuing a scan task for the target host, the server may first identify the host services running on the target host. Specifically, external service detection may be performed on the target host so as to detect the Internet-facing assets of the target host. Subsequently, vulnerability scanning may be executed on these Internet-facing assets. In addition, not all attacks come from external networks. Some attacks may also come from applications inside the target host. In this situation, the server may also perform internal application detection on the target host so as to detect the assets inside the target host.

In the disclosed embodiment, the above-detected assets may all serve as host services running on the target host. After detecting an existence of a host service running on the target host, the server may query the preset vulnerability database to identify the type of vulnerability that matches the host service. The significance of this process is that the server will not blindly issue scan tasks for all the host services, but only issue corresponding scan tasks for the host services that may have a vulnerability. In this way, after identifying the type of vulnerability that matches the host service, the server may create a scan task corresponding to the type of vulnerability. Here, the scan task corresponding to the type of vulnerability may server as the scan task that matches the host service.

S13: issuing the created scan task to a task scheduling center, to allow a proxy node to acquire at least one scan task from the task scheduling center, where the proxy node executes the at least one scan task for the target host, and obtains a scan result.

In the disclosed embodiment, after creating a scan task for the target host, the server may issue the scan task to the task scheduling center. After receiving the scan task, the task scheduling center may place the scan task in a task queue to wait for the proxy node to acquire the scan task.

In the disclosed embodiment, a proxy node may selectively acquire a scan task from the task scheduling center based on its own instant load status. Specifically, a proxy node may include a load balancing module. The load balancing module may obtain the current load parameters of the proxy node when the proxy node is about to acquire a scan task from the task scheduling center. The load parameters may include, for example, the instant CPU usage of the proxy node, the memory usage, the number of processing scan tasks, and the like. The load balancing module may comprehensively calculate the current load value of the proxy node based on the load parameters. The higher the load value, the lower the proxy node's ability to handle scan tasks. In this way, the load balancing module may determine the number of scan tasks expected to be acquired from the task scheduling center based on the instant load value of the proxy node. Specifically, the load balancing module may store in advance a mapping relationship table between load values and the number of tasks. In the mapping relationship table, the load values may be divided into ranges, and the number of tasks corresponding to each range may be obtained. In this way, after the instant load value of the proxy node is determined, the number of scan tasks expected to be acquired may be determined through the mapping relationship table.

In the disclosed embodiment, after obtaining the scan task for the target host, the proxy node may execute the acquired scan task through a scan interface provided in advance by the target host. During the execution of the scan task, possible vulnerabilities with respect to the host service may be detected on the target host. When the execution of the scan task is completed, a scan result may be summarized based on the vulnerability information obtained through the scanning. The scan result may be fed back to the server by the proxy node.

S15: receiving the scan result fed back by the proxy node, determining whether there exists a specified host service in the identified host service, where the specified host service signifies an existence of a website resource running on the target host, and if there exists the specified host service in the identified host service, issuing again a scan subtask corresponding to the specified host service to the task scheduling center, where the scan subtask is acquired by the proxy node from the task scheduling center and executed for the target host to obtain a scan result corresponding to the specified host service on the target host.

In the disclosed embodiment, a server may receive the scan result fed back by the proxy node. The scan result is a result of a preliminary scanning of the host service. The above-noted scan task may be a shallow scanning of the host service that may have a vulnerability. For some important host services, no detailed scanning will be further executed. Accordingly, in the disclosed embodiment, the scan tasks may be issued multiple times in a deeper and deeper manner. Specifically, the server may determine whether a specified host service exists in the identified host service. The specified host service may signify an existence of a website resource running on the target host. Since websites are usually accessed by a large number of users, a specified host service within the website resource may be a relatively important service on the target host and may be a service that is easily attacked. For example, the specified host service is an HTTP service. In real applications, when it is detected that the HTTP service is enabled on the target host, the server may again create a scan subtask for the HTTP service. This scan subtask may execute additional scanning for the website resource.

In some embodiments, the server may collect the page address associated with the website resource when an HTTP service is detected to exist on the target host. The page address may be a page Uniform Resource Locator (URL) existing on the website. After the page address associated with the website resource is collected, a page application scan task corresponding to the page address may be created. The page application scan task may scan for possible vulnerabilities on a page of the website. Compared to the above-noted scan tasks for general host services on the target host, a page application scan task may execute vulnerability scanning more finely for a page of the website associated with the HTTP service. In this way, in the disclosed embodiment, the scan subtask created by the server may be a page application scan task.

In the disclosed embodiment, after creating a page application scan task, the server may again issue the page application scan task to the task scheduling center. In this way, the proxy node may continue to acquire at least one page application scan task from the task scheduling center. Corresponding scan result for the page may be obtained after the proxy node executes the at least one page application scan task for the target host. The scan result may be also fed back to the server.

In some embodiments, a plurality of page components may be included in a webpage. The page components may be identified by a web fingerprint. Specifically, after collecting the page address, a web fingerprint of the page address may be further identified. In real applications, the web fingerprint corresponding to the page address may be identified by the keywords in the webpage, MD5 code of a specified file, keywords in the page address, or the TAG mode of the page address. After identifying the web fingerprint, the server may match the identified web fingerprint with the preset fingerprint database, so as to determine whether the identified web fingerprint is the specified web fingerprint existing in the preset fingerprint database. It is very likely that a page component signified by a specified web fingerprint has a vulnerability. Therefore, in the disclosed embodiment, when it is determined that the identified web fingerprint is a specified web fingerprint existing in the preset fingerprint database, vulnerability scanning may be further executed for the page component corresponding to the web fingerprint.

Specifically, in the disclosed embodiment, the server may create a page component scan task, and the page component scan task may be configured to scan a page component included in the webpage corresponding to the page address. After creating the page component scan task, the server may again issue the created page component scan task to the task scheduling center, so that the proxy node obtains at least one page component scan task from the task scheduling center. In this way, after the proxy node executes the at least one page component scan task for the target host, a page component scan result corresponding to the target host may be obtained.

As can be seen from the above, when executing vulnerability scanning on the target host, the scan tasks may be issued multiple times. Each time, the issued scan task is determined based on the identification of a service, a website, or a component on the host. Not only may the host be scanned for the vulnerability, a website on the host may be also scanned for the vulnerability, and a webpage component may be scanned as well. As the scan tasks are issued multiple times, the scanning process for the target host will become finer and finer. Different from the scanning methods using the customized content in the existing technologies, the technical solutions of the present disclosure may issue different scan tasks for different hosts, and the scanning depth also deepens as the number of times of scanning increases, thereby achieving comprehensive and accurate vulnerability scanning.

In real applications, due to different operators, the network environments where hosts are located may vary greatly. In the existing technologies, when a host is scanned, it is very likely that the communication with the to-be-scanned host may not be established due to network reasons, or the communication is slow. In view of this, in the disclosed embodiment of the present disclosure, a matching proxy node may be selectively employed to execute a scan task based on the network environment where the target host is located. Specifically, when a target host needs to be scanned, the network environment where the target host is located may be identified. For example, the operator corresponding to the network currently utilized by the target host may be identified, and the current geographical location of the target host may also be determined. Subsequently, a target proxy node that matches the identified network environment may be determined. For example, the determined target proxy node may be on the same network as the operator of the target host, and the target proxy node is relatively close to the target host. In an actual application scenario, the target proxy node that matches the target host may be selected by means of a content delivery network. In this way, a scan task may be subsequently acquired from the task scheduling center by the target proxy node, and the acquired scan task is executed by the target proxy node for the target host. Due to the same network environment, it is possible to maintain a good communication connection, so that the problem of low scanning efficiency due to the difference in the network environment may be avoided.

In some embodiments, after selecting a proxy node that matches the network environment where the target host is located to execute the scan task and obtain the scan result, in order to improve the upload efficiency of the scan result, a transmission path for feeding back the scan result may be purposely selected in the content delivery network. The network environment where each proxy node is located in the transmission path may match the network environment where the target host is located. In this way, the server may identify the network environment where the target host is located, and receive and identify the scan result reported by the proxy node that matches the identified network environment.

In some embodiments, some ports on the target host may generate serious vulnerability. If access control measures are not set in these ports and these ports are set to open directly, data leakage of the target host may occur. Therefore, in the disclosed embodiment, a specified port of the target host may be periodically scanned at a specified interval. The specified port may be an above-noted port that needs to set access control measures. When the scan result indicates that the specified port does not have access control measures, it indicates that the specified port may lead to data leakage. In this situation, a warning message may be generated for the specified port to remind the administrator of the target host to take corresponding actions in time, or new matching access control measures may be added based on the scan result.

In some embodiments, a scan task may be also flexibly configured on the server side. Specifically, various scan parameters for executing a scan task may be customized on the server side. The scan parameters may be, for example, a defined scan depth, the number of times of scanning, and the like. In this way, the scanning parameters may define a scanning mode corresponding to the scan task. Sequentially, when a successive proxy node executes the scan task, it may execute the scan task according to the scan mode defined by the scan parameters. The purpose of this process is to flexibly configure a vulnerability scanning process based on the requirements of users.

Embodiment 2

Figure 4:
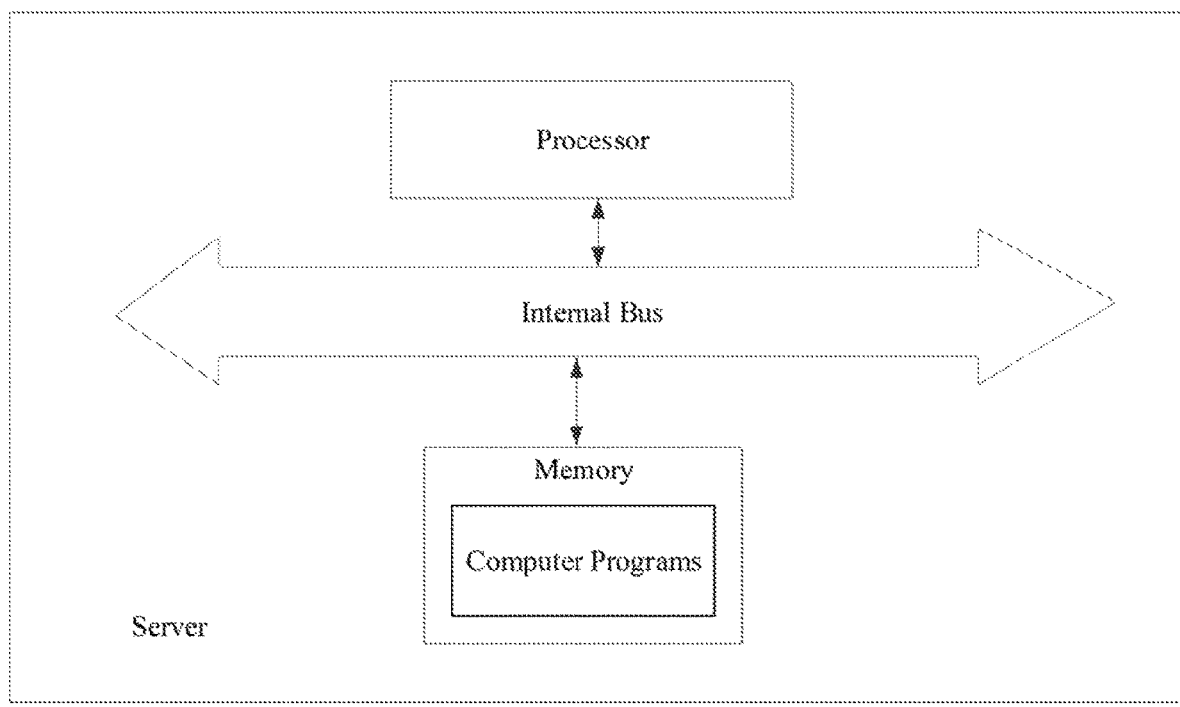
FIG. 4 is a schematic structural diagram of a server according to some embodiments of the present disclosure.

Referring to FIG. 4, the present disclosure further provides a server. The server comprises a memory and a process, where the memory stores computer programs that, when executed by the processor, implement the following steps:

S11: identifying a host service running on a target host and creating a scan task that matches the identified host service;

S13: issuing the created scan task to a task scheduling center, to allow a proxy node to acquire at least one scan task from the task scheduling center, where the proxy node executes the at least one scan task for the target host, and obtains a scan result; and S15: receiving the scan result fed back by the proxy node, determining whether there exists a specified host service in the identified host service, where the specified host service signifies an existence of a web site resource running on the target host, and if there exists the specified host service in the identified host service, issuing again a scan subtask corresponding to the specified host service to the task scheduling center, where the scan subtask is acquired by the proxy node from the task scheduling center and executed for the target host to obtain a scan result corresponding to the specified host service on the target host.

In some embodiments, the computer programs, when executed by the processor, further implement the following steps:

collecting a page address associated with the website resource, and creating a page application scan task corresponding to the page address; and issuing again the created page application scan task to the task scheduling center, to allow the proxy node to acquire at least one page application scan task from the task scheduling center, where the proxy node executes the at least one page application scan task for the target host, and obtain a scan result corresponding to the page address.

In some embodiments, the computer programs, when executed by the processor, further implement the following steps:

identifying a web fingerprint of the page address, matching the web fingerprint with a preset fingerprint database, and if the web fingerprint is a specified web fingerprint existing in the preset fingerprint database, creating a page component scan task; and issuing again the created page component scan task to the task scheduling center, to allow the proxy node to acquire at least one page component scan task from the task scheduling center, where the proxy node executes the at least one page component scan task for the target host, and obtain a page component scan result corresponding to the target host.

Embodiment 3

Figure 5:
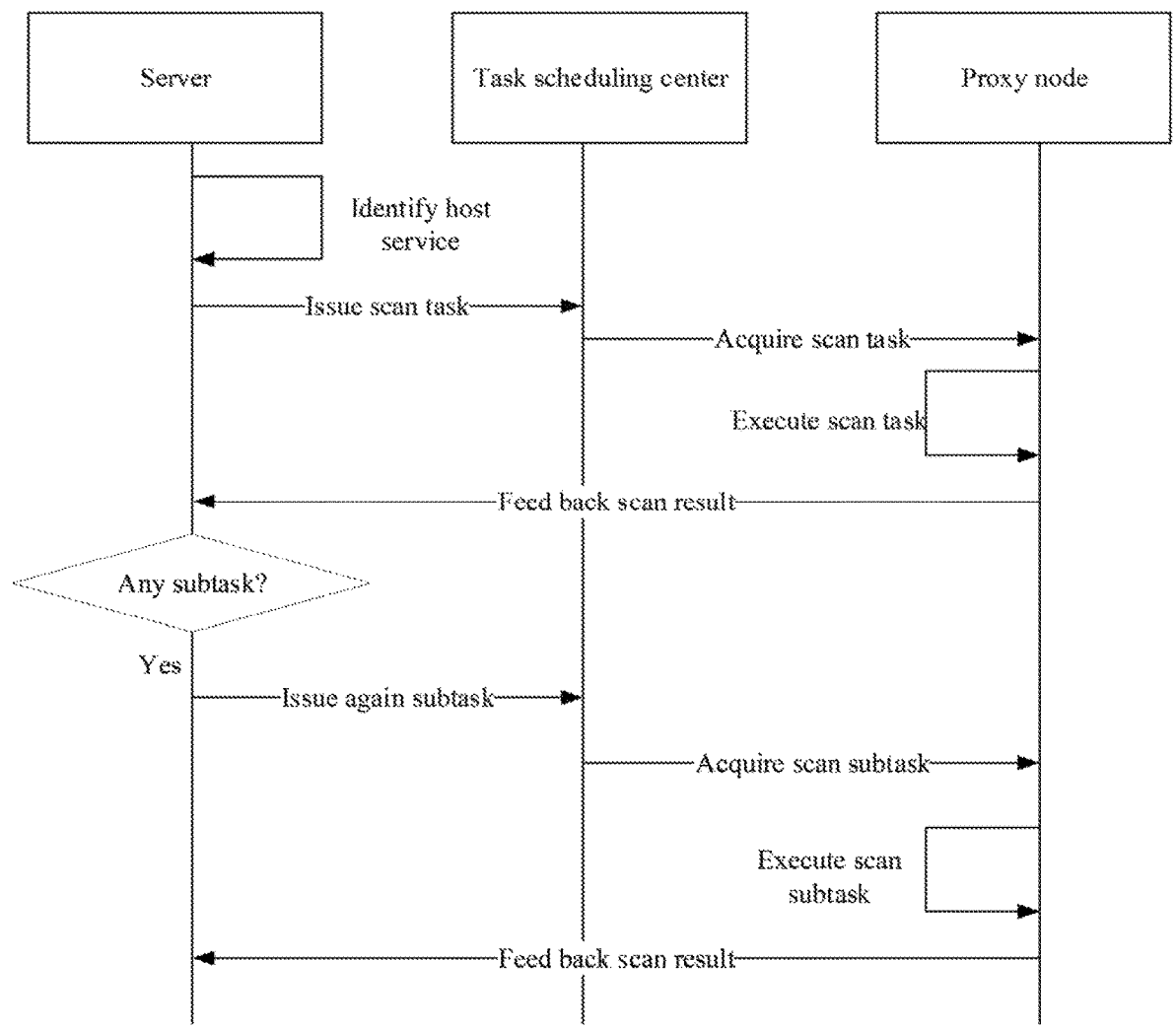
FIG. 5 is an interactive diagram of different entities according to some embodiments of the present disclosure.

Referring to FIG. 1 and FIG. 5, the present disclosure further provides a vulnerability scanning system. The system comprises a server, a task scheduling center, and a proxy node, where:

the server is configured to identify a host service running on a target host, create a scan task that matches the identified host service, issue the created scan task to a task scheduling center, determine whether there exists a specified host service in the identified host service, where the specified host service signifies an existence of a website resource running on the target host, if there exists the specified host service in the identified host service, issue again a scan subtask corresponding to the specified host service to the task scheduling center, and receive a scan result fed back by the proxy node;

the task scheduling center is configured to receive the scan task or scan subtask issued by the server, and place the received scan task or scan subtask in a task queue; and the proxy node is configured to acquire at least one scan task or scan subtask from the task scheduling center, execute the at least one scan task or scan subtask for the target host to obtain a scan result, and feed back the obtained scan result to the server.

In the disclosed embodiment, there may be multiple proxy nodes, each of which may be connected to the task scheduling center. Some of the proxy nodes may acquire different scan tasks for the same host, and these proxy nodes may execute the acquired scan tasks in parallel, thereby improving the efficiency of vulnerability scanning.

In some embodiments, the server is further configured to collect a page address associated with the website resource, create a page application scan task corresponding to the page address, and issue again the created page application scan task to the task scheduling center.

In some embodiments, after collecting the page address associated with the website resource, the server is further configured to identify a web fingerprint of the page address, and match the web fingerprint with a preset fingerprint database. If the web fingerprint is a specified web fingerprint existing in the preset fingerprint database, the server creates a page component scan task, and issues again the created page component scan task to the task scheduling center.

In some embodiments, the server is further configured to identify a network environment where the target host is located, and determine a target proxy node that matches the identified network environment, so as to acquire a scan task or scan subtask from the task scheduling center through the target proxy node. Further, the target proxy node executes the acquired scan task or scan subtask for the target host.

In some embodiments, the proxy node further includes an address lookup module, and the address lookup module is configured to determine a target proxy node that matches a network environment where the target host is located and report the scan result through the determined target proxy node to the server.

In some embodiments, the proxy node further includes a load balancing module, and the load balancing module is configured to obtain current load parameters of the proxy node, and determine the number of scan tasks or scan subtasks that are expected to be acquired from the task scheduling center based on the load parameters. Specifically, the proxy node may selectively acquire a scan task from the task scheduling center based on its instant load status. The load balancing module may acquire the instant load parameters of the proxy node when the proxy node is about to acquire a scan task from the task scheduling center. The load parameters may include, for example, the instant CPU usage of the proxy node, the memory usage, the number of processing scan tasks, and the like. The load balancing module may comprehensively calculate the current load value of the proxy node based on the load parameters. The higher the load value, the lower the proxy node's ability to handle scan tasks. In this way, the load balancing module may determine the number of scan tasks expected to be acquired from the task scheduling center based on the instant load value of the proxy node. Specifically, the load balancing module may store in advance a mapping relationship table between load values and the number of tasks. In the mapping relationship table, the load values may be divided into ranges, and the number of tasks corresponding to each range may be obtained. In this way, after the instant load value of the proxy node is determined, the number of scan tasks expected to be acquired may be determined through the mapping relationship table.

Figure 6:
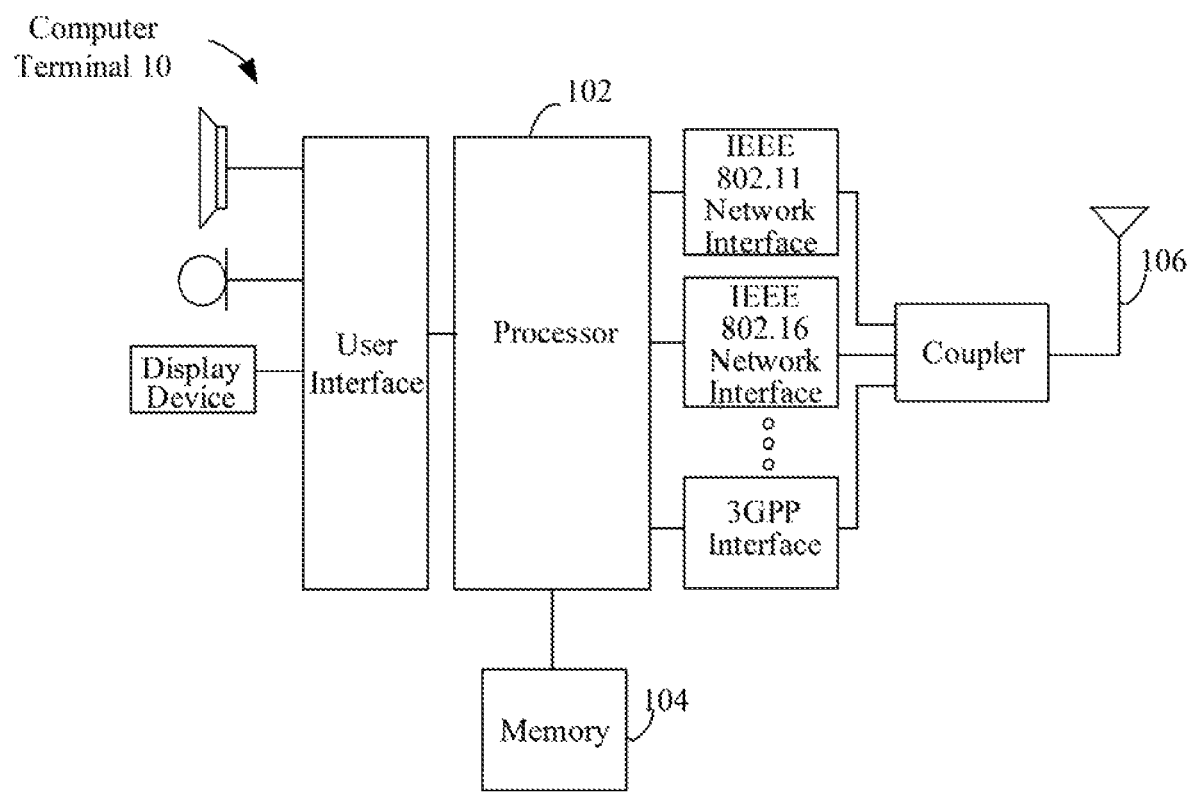
FIG. 6 is a schematic structural diagram of a computer terminal according to some embodiments of the present disclosure.

Referring to FIG. 6, in the present disclosure, the technical solutions of the disclosed embodiments may be applied to a computer terminal 10 shown in FIG. 6. The computer terminal 10 may include one or more (only one is shown in the figure) processors 102 (a processor 102 may include, but is not limited to, a processing device such as a microcontroller MCU or a programmable logic device FPGA), a memory 104 for storing data, and a transmission device 106 for communication purpose. Persons of ordinary skill in the art may understand that the structure shown in FIG. 6 is provided by way of illustration, but not by way of limitation of the structures of the above-described electronic devices. For example, the computer terminal 10 may also include more or fewer components than those shown in FIG. 6, or have a different configuration than that shown in FIG. 6.

The memory 104 may be used to store software programs and modules of application software. The processor 102 implements various functional applications and data processing by executing software programs and modules stored in the memory 104. The memory 104 may include a high-speed random access memory, and a non-volatile memory, such as one or more magnetic storage devices, flash memory, or other non-volatile solid-state memory. In some applications, the memory 104 may further include a memory remotely disposed with respect to the processor 102, which may be connected to the computer terminal 10 through a network. Examples of such network may include, but are not limited to, the Internet, an intranet, a local area network, a mobile communication network, and combinations thereof.

The transmission device 106 is configured to receive or transmit data via the network. The aforementioned specific examples of the network may include a wireless network provided by the communication provider of the computer terminal 10. In one application, the transmission device 106 includes a network interface controller (NIC). The transmission device 106 may be connected to other network devices through the base stations, so as to communicate with the Internet. In another application, the transmission device 106 may be a Radio Frequency (RF) module that is configured to communicate with the Internet via a wireless approach.

As can be seen from the above, the technical solutions provided by the present disclosure may issue scan tasks multiple times when executing vulnerability scanning on a target host, and each issued scan task is determined based on an identification of a host service, a website, or a component on the host. Specifically, when a host service is identified on the target host, the server may issue a scan task corresponding to the host service to the task scheduling center. If the identified host service contains a specified host service that signifies a website resource, the server may issue again a scan subtask for the specified host service. Compared to the previously issued scan task, the scan subtask may scan possible vulnerabilities in the specified host service more comprehensively. After issuing the scan subtask for the specified host service that signifies the website resource, a page address associated with the website resource may also continue to be collected. For the collected page address, the server may further issue a page application scan task, so that possible vulnerabilities in a page of the website may be further scanned. Further, a web fingerprint corresponding to the collected page address may be identified. By matching the web fingerprint with the preset fingerprint database, it may be determined whether a specified page component exists in the page of the website. If there exists the specified page component, the server may further issue a page component scan task, so that the specified page component with possible vulnerabilities can be scanned. As can be seen from the above, the technical solutions provided by the present disclosure generate the corresponding scan tasks each time based on the results identified from the host, and issue the scan tasks multiple times, so that the target host can be deliberately scanned deeper and deeper. In addition, the technical solutions provided by the present disclosure may not only scan the host, but also scan the websites that are operated and maintained on the host, so that a more comprehensive scanning process can be achieved. In terms of system architecture, by adopting a distributed scanning mode of the server and proxy nodes, a mode of multiple proxy nodes scanning in parallel may be employed to improve the efficiency of vulnerability scanning. Therefore, the technical solutions provided by the present disclosure may not only improve the accuracy of vulnerability scanning, but also the efficiency of the vulnerability scanning.

Through the foregoing description of the disclosed embodiments, it is clear to those skilled in the art that the various embodiments may be implemented in the form of software with a necessary general hardware platform, or implemented in the form of hardware. In light of this understanding, the above technical solutions, or essentially the parts that contribute to the existing technologies, may take the form of software products. The computer software products may be stored in a computer-readable storage medium, such as a ROM/RAM, a magnetic disk, or an optical disc, that includes a set of instructions to direct a computing device (may be a personal computer, a server, or a network device, etc.) to implement each disclosed embodiment or part of the described methods of the disclosed embodiments.

Although the present disclosure has been described as above with reference to some preferred embodiments, these embodiments should not be constructed as limiting the present disclosure. Any modifications, equivalent replacements, and improvements made without departing from the spirit and principle of the present disclosure shall fall within the scope of the protection of the present disclosure.

What is claimed is:

1. A vulnerability scanning method, comprising:
identifying a host service running on a target host and creating a scan task that matches the identified host service;
issuing the created scan task to a task scheduling center, to allow a proxy node to acquire at least one scan task from the task scheduling center, wherein the proxy node executes the at least one scan task for the target host, and obtains a scan result; and
receiving the scan result fed back by the proxy node, determining whether there exists a specified host service in the identified host service, wherein the specified host service signifies an existence of a website resource running on the target host, and if there exists the specified host service in the identified host service, issuing again a scan subtask corresponding to the specified host service to the task scheduling center, wherein the scan subtask is acquired by the proxy node from the task scheduling center and executed for the target host to obtain a scan result corresponding to the specified host service on the target host.

2. The method according to claim 1, wherein creating the scan task that matches the identified host service includes:

searching a preset vulnerability database for a type of vulnerability that matches the identified host service; and
creating a scan task for the type of vulnerability, and setting the created scan task as the scan task that matches the identified host service.

3. The method according to claim 1, wherein the scan subtask includes a page application scan task, and issuing again the scan subtask corresponding to the specified host service to the task scheduling center includes:
collecting a page address associated with the website resource, and creating the page application scan task corresponding to the page address; and
issuing again the created page application scan task to the task scheduling center, to allow the proxy node to acquire at least one page application scan task from the task scheduling center, wherein the proxy node executes the at least one page application scan task for the target host, and obtain a scan result corresponding to the page address.

4. The method according to claim 3, after collecting the page address associated with the website resource, the method further includes:
identifying a web fingerprint of the page address, matching the web fingerprint with a preset fingerprint database, and if the web fingerprint is a specified web fingerprint existing in the preset fingerprint database, creating a page component scan task; and
issuing again the created page component scan task to the task scheduling center, to allow the proxy node to acquire at least one page component scan task from the task scheduling center, wherein the proxy node executes the at least one page component scan task for the target host, and obtain a page component scan result corresponding to the target host.

5. The method according to claim 1, further comprising:
identifying a network environment where the target host is located, and determining a target proxy node that matches the identified network environment; and
acquiring the scan task from the task scheduling center through the target proxy node, and executing the acquired scan task for the target host by the target proxy node.

6. The method according to claim 1, wherein receiving the scan result fed back by the proxy node includes:
identifying a network environment where the target host is located, and receiving the scan result reported by a proxy node that matches the identified network environment.

7. The method according to claim 1, further comprising:
periodically scanning a specified port of the target host according to a specified time interval, and when the scan result indicates that the specified port does not have access control measures, generating a warning message for the specified port.

8. The method according to claim 1, wherein the scan task includes scan parameters, and the scan parameters are used to define a scan mode corresponding to the scan task, and the proxy node executes the scan task according to the scan mode defined by the scan parameters.

9. A server, comprising a memory and a processor, wherein the memory stores computer programs that, when executed by the processor, implement the following steps:
identifying a host service running on a target host and creating a scan task that matches the identified host service;

issuing the created scan task to a task scheduling center, to allow a proxy node to acquire at least one scan task from the task scheduling center, wherein the proxy node executes the at least one scan task for the target host, and obtains a scan result; and receiving the scan result fed back by the proxy node, determining whether there exists a specified host service in the identified host service, wherein the specified host service signifies an existence of a website resource running on the target host, and if there exists the specified host service in the identified host service, issuing again a scan subtask corresponding to the specified host service to the task scheduling center, wherein the scan subtask is acquired by the proxy node from the task scheduling center and executed for the target host to obtain a scan result corresponding to the specified host service on the target host.

10. The server according to claim 9, wherein the computer programs, when executed by the processor, further implement the following steps:

collecting a page address associated with the website resource, and creating a page application scan task corresponding to the page address; and issuing again the created page application scan task to the task scheduling center, to allow the proxy node to acquire at least one page application scan task from the task scheduling center, wherein the proxy node executes the at least one page application scan task for the target host, and obtain a scan result corresponding to the page address.

11. The server according to claim 10, wherein the computer programs, when executed by the processor, further implement the following steps:

identifying a web fingerprint of the page address, matching the web fingerprint with a preset fingerprint database, and if the web fingerprint is a specified web fingerprint existing in the preset fingerprint database, creating a page component scan task; and issuing again the created page component scan task to the task scheduling center, to allow the proxy node to acquire at least one page component scan task from the task scheduling center, wherein the proxy node executes the at least one page component scan task for the target host, and obtain a page component scan result corresponding to the target host.

12. A vulnerability scanning system, comprising a server, a task scheduling center, and a proxy node, wherein:

the server is configured to identify a host service running on a target host, create a scan task that matches the identified host service, issue the created scan task to a task scheduling center, determine whether there exists a specified host service in the identified host service, wherein the specified host service signifies an existence of a website resource running on the target host, if there exists the specified host service in the identified host service, issue again a scan subtask corresponding to the specified host service to the task scheduling center, and receive a scan result fed back by the proxy node;

the task scheduling center is configured to receive the scan task or scan subtask issued by the server, and place the received scan task or scan subtask in a task queue; and the proxy node is configured to acquire at least one scan task or scan subtask from the task scheduling center, execute the at least one scan task or scan subtask for the target host to obtain a scan result, and feed back the obtained scan result to the server.

13. The system according to claim 12, wherein the server is further configured to collect a page address associated with the website resource, create a page application scan task corresponding to the page address, and issue again the created page application scan task to the task scheduling center.

14. The system according to claim 13, after collecting the page address associated with the website resource, the server is further configured to identify a web fingerprint of the page address, match the web fingerprint with a preset fingerprint database, if the web fingerprint is a specified web fingerprint existing in the preset fingerprint database, create a page component scan task, and issue again the created page component scan task to the task scheduling center.

15. The system according to claim 12, wherein the server is further configured to identify a network environment where the target host is located, and determine a target proxy node that matches the identified network environment, so as to acquire a scan task or scan subtask from the task scheduling center through the target proxy node, wherein the acquired scan task or scan subtask is executed by the target proxy node for the target host.

16. The system according to claim 12, wherein the proxy node further includes an address lookup module, and the address lookup module is configured to determine a target proxy node that matches a network environment where the target host is located and report the scan result through the determined target proxy node to the server.

17. The system according to claim 12, wherein the proxy node further includes a load balancing module, and the load balancing module is configured to acquire current load parameters of the proxy node, and determine the number of scan tasks or scan subtasks that are expected to be acquired from the task scheduling center based on the load parameters.

* * * * *